United States Patent [19]

Kloots

[11] 4,104,709
[45] Aug. 1, 1978

[54] SURGEONS HEADLIGHT WITH CONTINUOUSLY VARIABLE SPOT SIZE

[75] Inventor: Jacobus Kloots, Sturbridge, Mass.

[73] Assignee: Applied Fiberoptics, Inc., Southbridge, Mass.

[21] Appl. No.: 786,283

[22] Filed: Apr. 11, 1977

[51] Int. Cl.² ............................................. F21C 15/14
[52] U.S. Cl. .................................... 362/105; 362/282; 362/321; 362/804; 128/20
[58] Field of Search ................. 128/20; 362/105, 255, 362/280, 282, 321, 804

[56] References Cited

U.S. PATENT DOCUMENTS

| 1,705,465 | 3/1929 | Cameron | 128/23 |
| 3,285,242 | 11/1966 | Wallace | 362/105 |
| 3,371,202 | 2/1968 | Moore et al. | 128/23 |
| 3,745,993 | 7/1973 | Feinbloom | 362/105 |
| 3,947,676 | 3/1976 | Battilana et al. | 362/105 |
| 3,951,139 | 4/1976 | Kloots | 128/23 |

*Primary Examiner*—Peter A. Nelson
*Attorney, Agent, or Firm*—Thomas N. Tarrant

[57] ABSTRACT

A surgeon's headlight utilizing an adjustable iris diaphragm to allow continuous variation of the diameter of the illuminated spot.

8 Claims, 3 Drawing Figures

SURGEONS HEADLIGHT WITH CONTINUOUSLY VARIABLE SPOT SIZE

BACKGROUND OF THE INVENTION

1. Field of the Invention

The present invention relates to surgeons headlights, and particularly to such headlights utilizing fiberoptic cables to introduce the light from a separate illuminating source.

2. Description of the Prior Art

In recent years, headlights used by surgeons and for other medical and dental purposes have become greatly reduced in size and weight. A principal factor in size reduction has been the use of flexible fiberoptic cables to carry the light from a separate light source. U.S. Pat. No. 3,951,139 of the present applicant discloses an example of such a headlight. With these small headlights it is not easy to allow for adjustment of the optical components to vary the size of the illuminating spot.

When a surgeon is trying to operate within a very small cavity, an illuminating spot larger than the cavity opening results in a substantial amount of undesired reflected light. This light reduces the visibility of the objects of surgical interest, since too much of the return light does not carry the visual information desired. If the illuminating spot can be reduced in size so that only the cavity interior is illuminated, the surgeon's viewing is greatly improved. Nevertheless, surgeon's headlights today generally have a fixed spot size. In some cases a dead black cloth is utilized around the operating aperture to absorb the unwanted light.

SUMMARY OF THE INVENTION

The present invention provides a surgeon's headlight producing an illuminated spot of which the size can be varied continuously between wide limits. A fiberoptic cable entrance brings light to the device; a diaphragm selects the part of the incoming lightbeam that will be used, and an exit lens system images the diaphragm onto the object to be illuminated. This results in a system where variation of the diaphragm aperture varies the size of the illuminated spot. Additional entrance optics close to the diaphragm help to keep the illuminance constant while the spot size is varied by imaging the light source (exit face of fiberoptic cable) on the entrance surface of the exit lens system.

Since this arrangement is essentially masking off part of the light, undesired heat generation in the headlight might be expected. Fortuitously, the light reaching the headlight in modern fiberoptic headlight systems is very low in thermal energy. The longer light wavelengths are highly attenuated in the cable and usually by additional filtering at the source. Thus heat resulting from the iris is minimal.

The headlight of the invention is provided with a projecting "joystick" on top of the lamp unit for changing beam direction and a projecting knob behind the joystick provides variation of spot diameter by rotation about the optical axis. Thus both spot diameter and beam direction are readily adjusted.

Further objects and features of the invention will become apparent upon reading the following description together with the drawing.

DESCRIPTION OF THE PREFERRED EMBODIMENT:

A surgeon's headlight, according to the invention, necessarily comprehends a headband, a light source and a fiber-optic connecting cable from the light source. The present description however only describes the light itself, since the other components are conventional in the present state of the art.

Figure 1:
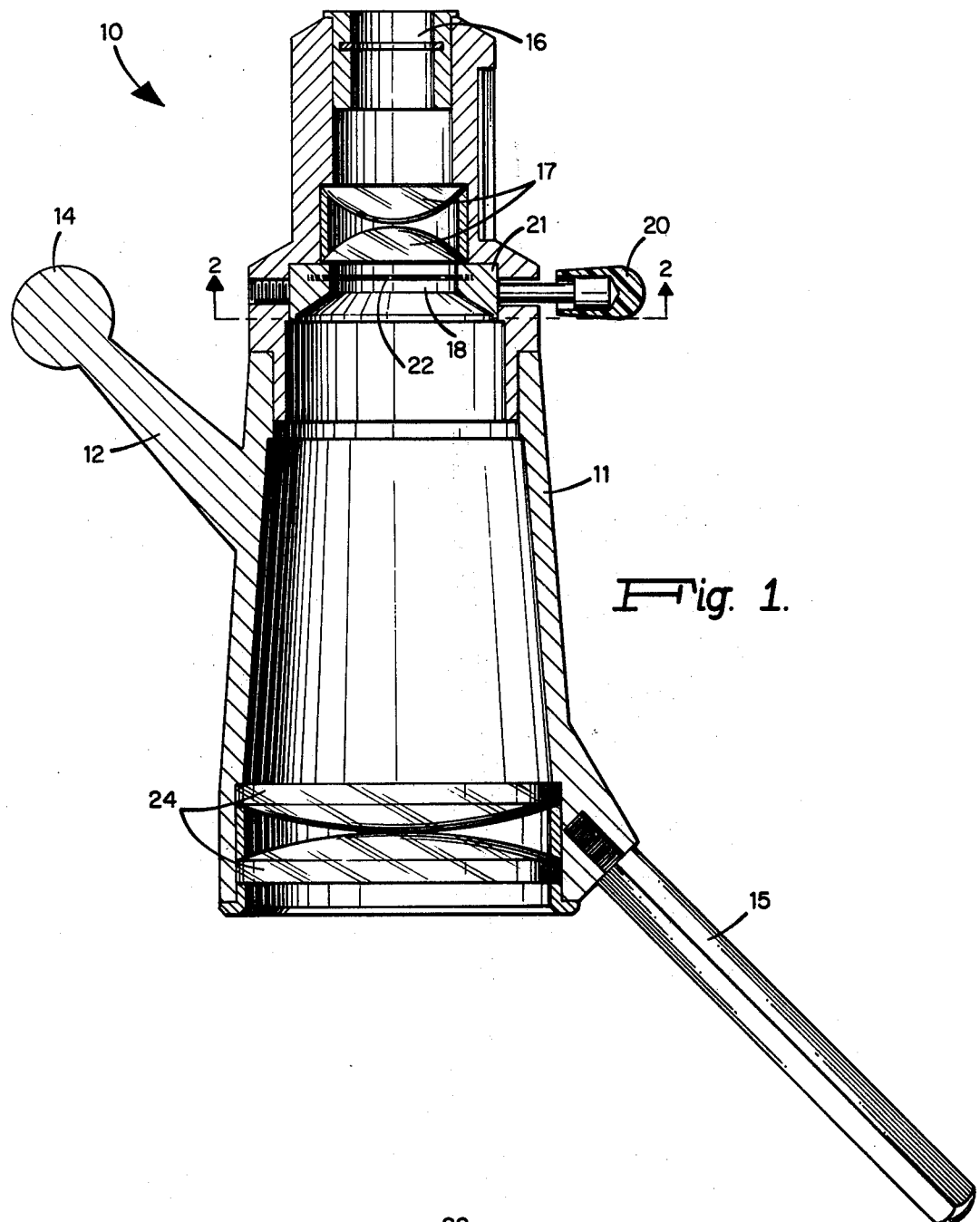
FIG. 1 is a cross-sectional view of one embodiment of the invention.

Light 10 is depicted in FIG. 1 with a body made of housing 11. Housing 11 is suitably a metal die casting or a plastic molding. Integral with housing 11 is arm 14 extending outward and terminating in ball 14. Ball 14 is designed to mate with a ball socket mounted to a headband so as to provide an adjustable ball and socket joint.

Extending from the front top of housing 11 is handle 15 which serves in the manner of a "joystick" for adjusting lamp 10 in the ball and socket joint (not joint). Coaxially at the rear of housing 11 is receptacle 16 for a fiberoptic cable (not shown). The interior of housing 11 is hollow and following receptacle 16 toward the front of housing 11 is condenser lens 17. The purpose of lens system 17 is to collect light efficently from the source and apply the correct magnification to fully illuminate the exit pupil. A combination of two plano-convex lenses back to back (plano-convex doublet) such as depicted, is commonly used for this purpose. Thus lens system 17 provides an enlarged image, of that plane in receptacle 16 where the exit surface of a fiberoptic cable would lie, upon the entrance surface of lens system 24.

Immediately following lens system 17 is iris 18. Iris 18 is suitably the conventional interleaved iris assembly found in cameras and a large variety of other optical equipment for control of light intensity. Iris 18 is operated by knob 20 projecting through housing 11 and connected inside housing 11 to ring 21. Ring 21 is coupled to the leaves or iris 18 so that rotation of ring 21 causes iris aperture 22 to open and close in conventional fashion.

Following iris 18 and located at the front of housing 11 is exit lens 24 which also serves as the exit pupil of the headlight. Lens 24 is depicted as a second condenser lens system of the plano-convex doublet style. In the depicted embodiment, lens 24 serves to image iris 18 at the plane to be illuminated. For medical purposes it has been found desirable to have an illuminated spot diameter variable from about 15 to 75 mm. at a distance of about 25 to 45 cm.

The characteristics of lens system 17, and its position relative to the fiberoptic cable and the other optical components of the headlight must be chosen such that, no matter how the diaphragm is adjusted, no part of lens 24 remains unilluminated. This is accomplished by using lens system 17 to image the exit face of the fiberoptic cable in the plane of the entrance face of lens system 24. As a matter of design, it is preferred to have iris 18 as close as convenient to the exit surface of lens sytem 17. The iris 18 is imaged by lens system 24 into the plane to be illuminated. If the size of the iris aperture is varied, the size of the illuminated spot varies accordingly. As the exit face of the fiberoptic bundle is not imaged into the plane of the illuminated spot, the granular structure of the exit face of the fiberoptic bundle is not at all visible in the illuminated spot. The illuminance in the spot (i.e. the lightflux measured per unit of area) is independent of the diaphragm setting, because the aperture of lens 24 remains fully utilized when the iris size is reduced.

Figure 2:
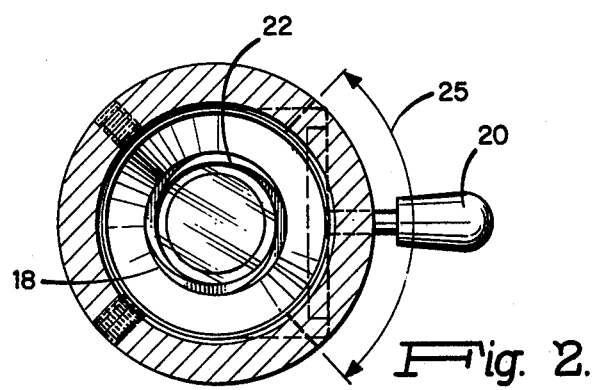
FIG. 2 is a cross-sectional view taken along line 2—2 of FIG. 1.

Referring to FIG. 2, it will be seen that knob 20 rides in slot 25 which restricts its maximum rotation. In the depicted embodiment, knob rotation is restricted to approximately 90° giving an iris aperture variation of 1 mm to 12 mm.

Figure 3:
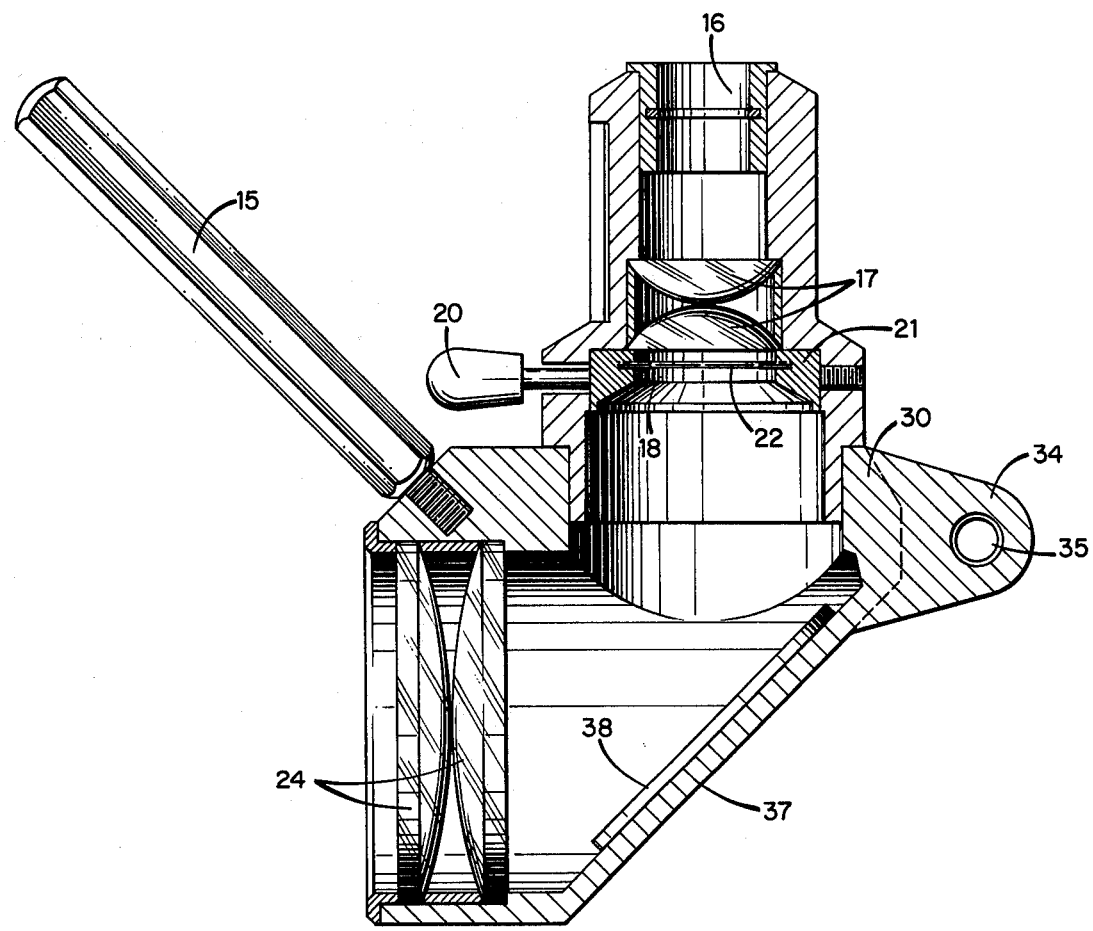
FIG. 3 is a cross-sectional view of a second embodiment of the invention.

FIG. 1 shows a headlight with the optics arranged coaxially in a straight line. FIG. 3 illustrates an alternative embodiment providing a 90° bend. The same reference numerals are used in FIG. 3 as in FIG. 1 for designating identical components.

Housing 30 has a vertical section 31 housing receptacle 16, condenser lens 17 and iris 18. Horizontal section 32 of housing 30 carries lens 24 and joystick 15. At the rear of setion 32 is integral protruding flange 34 with aperture 35 for mating in a swivel connection with a like flange from a headband (not shown). Rear wall 37 of section 32 is inclined at a 45° angle and supports reflector 38 on its inner surface. Reflector 38 is positioned centered with the optical axies of both lens 17 and lens 24 for bending the optical path through a 90° angle. Other devices such as prisms may be used equally for the same purpose.

Outside of the reflector and angular construction, the lamps of FIGS. 1 and 3 can be essentially identical. The construction of the FIG. 3 embodiment places knob 20 directly behind and close to joystick 15 permitting simultaneous adjustment of spot size and direction. Table I gives exemplary dimensions for the embodiment of FIG. 1, most of which can also be applied to the embodiment of FIG. 3.

TABLE I

| | |
|---|---|
| Spot size at 36 cm | 10 mm to 75 mm |
| Iris diaphragm (18) opening | 1 mm to 12 mm |
| Lens 17 diameter | 15 mm |
| Receptacle 16 I.D. | 7.5 mm |
| Lens 24 diameter | 30 mm |
| Space between receptacle 16 and lens 17 | 7 mm |
| Space between entrance surfaces of lenses 17 & 24 | 55 mm |
| Magnification of exit pupil from receptacle 16 at entrance pupil of lens 24 | 5 |
| Magnification of exit pupil from receptacle 16 at 36 cm from light | 45 |
| Space between iris 18 and exit of lens 17 | 1.5 mm |

Many variations are contemplated as within the invention. For example optical angles other than straight and 90° can be used. Exit lens 24 can be replaced with a simple plano-convex lens with a small loss in optical quality. The means for mounting to a headband is not critical and any of the various known mounting means may be utilized. Nor is the system aperture at any point critical. The particular pupil sizes are selected as a matter of design for the particular performance desired as is the magnification of the optical system. Thus it is intended to cover the invention as set forth in the following claims.

I claim:

1. A surgeon's headlight for providing a variable diameter illuminating spot comprising:
    (a) a lamp housing;
    (b) means to secure said housing to a headband;
    (c) a fiberoptic cable receptacle in said housing;
    (d) a fixed entrance condenser lens following said receptacle in said housing;
    (e) a variable iris proximate said entrance condenser lens in said housing;
    (f) a fixed exit lens following said iris in said housing arranged to image said iris in a field 25 to 45 cm in front of said housing; and,
    (g) manipulatable means connected to said iris and extending through said housing for varying the aperture of said iris, said condenser lens having a configuration and position to provide magnification of the exit pupil at said receptacle so as to illuminate the entire entrance surface of said exit lens, whereby changing the diameter of said iris will change the diameter of an illuminated spot without changing illuminance.

2. A surgeon's headlight according to claim 1 wherein said housing comprises a substantially vertical section holding said entrance condenser lens and a substantially horizontal section holding said exit lens and optical means are included in said housing for redirecting light from said condenser lens through said exit lens.

3. A surgeon's headlight according to claim 1 wherein the entrance surface of said condenser lens is spaced within 7 mm of said receptacle.

4. A surgeon's headlight according to claim 1 wherein said condenser lens is a plano-convex doublet.

5. A surgeon's headlight according to claim 4 wherein said exit lens is a plano-convex doublet.

6. A surgeon's headlight according to claim 1 wherein said iris is positioned within 3 mm of said condenser lens.

7. A surgeon's headlight according to claim 1 wherein said housing has a manipulating handle attached at its forward end and in line with said manipulatable means, said handle serving to adjust the position of said housing for directing said illuminating spot.

8. A surgeon's headlight according to claim 1 wherein a change in the diaphragm aperture of said iris of 1 mm to 12 mm produces a change in the illuminating spot 36 cm from said lamp of 10 to 75 mm.

* * * * *